Feb. 1, 1955   R. ROTH   2,701,116
PRESSURE FLUID FLOW CONTROL VALVE
Filed Dec. 30, 1953   3 Sheets-Sheet 1
Fig.1
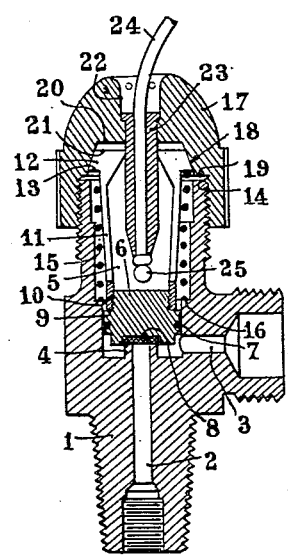
Fig.2
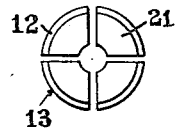
Fig.3
Fig.8
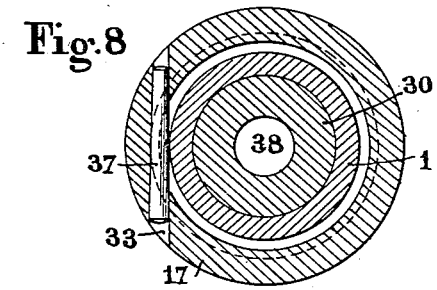
Fig.7
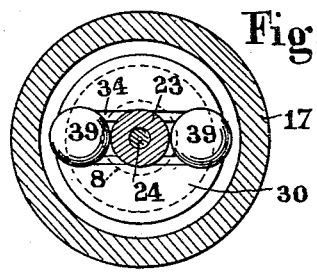
INVENTOR:
ROGER ROTH
BY
Michael S. Striker
Agt.

Feb. 1, 1955    R. ROTH    2,701,116
PRESSURE FLUID FLOW CONTROL VALVE
Filed Dec. 30, 1953    3 Sheets-Sheet 2

INVENTOR:
ROGER ROTH
BY:

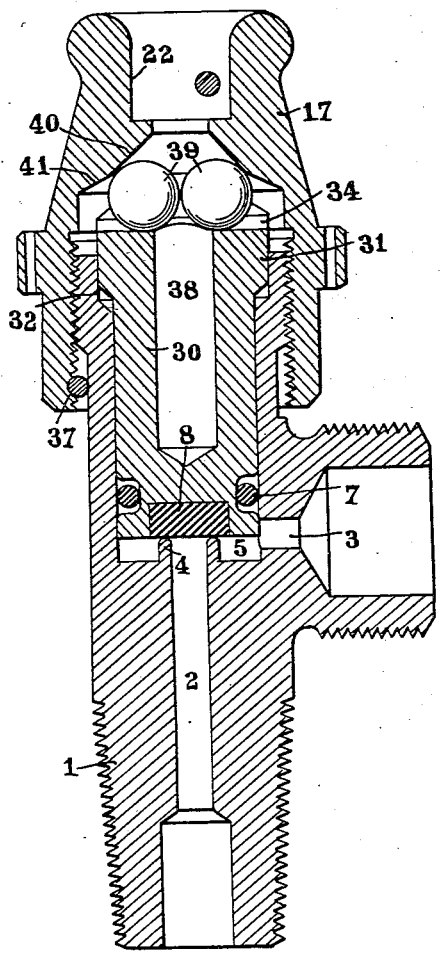
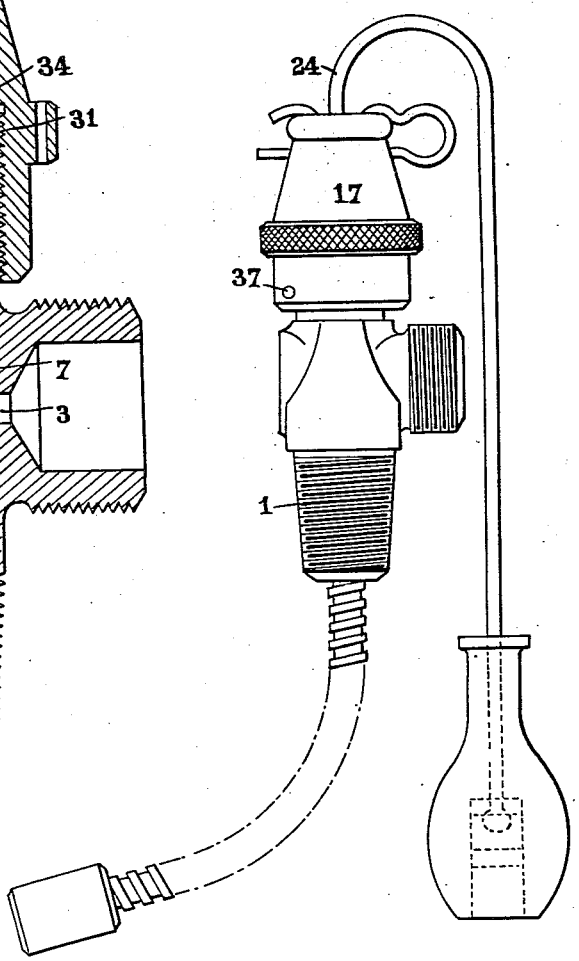
Fig. 6
Fig. 9
INVENTOR:
ROGER ROTH

United States Patent Office 2,701,116
Patented Feb. 1, 1955

2,701,116

PRESSURE FLUID FLOW CONTROL VALVE

Roger Roth, Asnieres, France

Application December 30, 1953, Serial No. 401,263

Claims priority, application France December 30, 1952

5 Claims. (Cl. 251—66)

This invention relates in general to valves for controlling the flow of fluids under pressure and more particularly, if not exclusively, to a valve of this type which is intended to connect a bottle or like container filled with compressed or liquefied gas with an object to be inflated, such as a floating body or a lifeboat, this valve being adapted for use with any device wherein the expansion of a fluid under pressure must be obtained through a very simple and quick control action, as in the case of fire-extinguishers.

This valve is characterized mainly in that the inlet and outlet ports of the valve are interconnected through a passage in which a gas-tight piston is slidably mounted and held in its valve-closing position by locking members wedged within a cap member secured to the valve body, between the inner walls of this cap member and a pin adapted to be removed by pulling a cord or wire emerging from the valve.

The inner walls of the cap member are preferably oblique to act as a ramp or cam face on the locking members as the cap member is screwed on or out of the valve body.

According to a first form of embodiment of the device of this invention, the locking members consist of resilient claws secured to the aforesaid gas-tight piston. According to another form of embodiment, the locking members consist of balls wedged between the cap member, the pin and the upper face of a piston-like member forming the upper extension of said gas-tight piston.

Other features and advantages of the invention will appear as the following description proceeds with reference to the accompanying drawings forming part of this specification and showing by way of example two preferred forms of embodiment of the invention.

In the drawings:

Fig. 1 is an axial section showing a first embodiment of a valve made in accordance with the teachings of this invention;

Fig. 2 is a plan view from above showing a detail of the valve illustrated in Fig. 1;

Figs. 3 to 6 are axial sections showing another form of embodiment of the valve;

Figs. 7 and 8 are cross-sectional views taken upon the lines VII—VII and VIII—VIII of Fig. 3, respectively;

Fig. 9 is an entire elevational view of the valve illustrated in Figs. 3 to 8.

Figure 4:
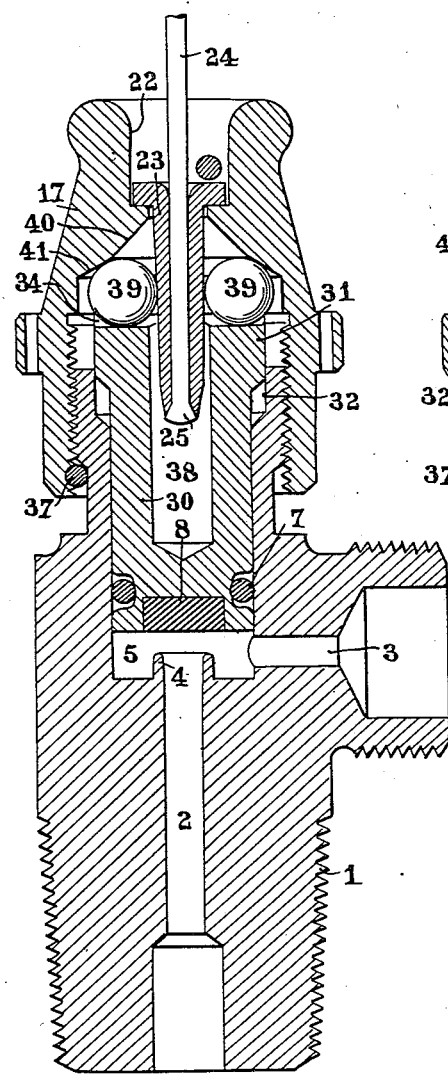

The valve shown in Fig. 1 consists essentially of a body 1 having on the one hand an axial passage 2 adapted to be connected to a bottle of compressed gas, and on the other hand a radial passage 3 communicating with the passage 2 and adapted to be connected to the object to be inflated. The bottle containing the gas under pressure (not shown) is secured beforehand by screwing or otherwise to the lower portion of the body 2 which surrounds the inlet passage 2. The article to be inflated is also secured beforehand to the lateral body portion surrounding the outlet passage 3.

The axial passage 2 opens centrally of a cylindrical seat 4 into a chamber 5 extending throughout the upper portion of the body 1. In the lower portion of this chamber 5 there is slidably mounted a piston 6 having an annular packing 7 to provide a gas-tight sliding engagement between the piston and the surrounding wall of the chamber. The bottom face of the piston 6 is formed with a recess receiving a resilient disc 8 adapted to cooperate with the valve-seat forming top annular surface of the cylindrical seat 4. This valve assembly is completely gas tight, as long as the piston 6 bears through the resilient disc 8 on the top surface of seat 4. The piston 6 is formed with an outer annular shoulder 9 on which the lower annular edge of a collar member 10 is adapted to bear under conditions to be described presently; this collar 10 is screwed or otherwise secured on the piston 6, and it is formed with four upward extensions 11 formed integrally at their top with claw-forming portions 12 converging toward the axis of the valve when the latter is ready for use. The inherent resiliency of the four extensions 11 urges these claws 12 toward the valve axis for a purpose to be explained later on. The four claws 12 are formed with outer shoulders 13 (see Fig. 2) positioned somewhat above the upper surface of the body 1, to avoid preventing the collar 10 and the integral claws 12 thereof from being fully lowered into the chamber 5, upon assembling the parts, until the axial passage 2 is efficiently stopped by the resilient disc 8.

The radial passage 3 opens into the lower portion of chamber 5 at a level low enough to prevent this passage from being occluded by the piston and disc assembly 6, 8 when the latter is in its lowermost position and engages the top surface of seat 4.

A helical compression spring 15 may be threaded into chamber 5 so as to surround the piston 6, collar 10 and extensions 11, as shown. This spring 15 bears with its lower end against the annular shoulder 16 formed in the chamber 5 and with its upper end against the aforesaid outer shoulders 13 of claws 12, thereby tending to lift the latter bodily with collar 10, piston 6 and disc 8.

The upper portion of the valve body 1 has screwed thereon a cap member 17 having the upper portion of its lateral inner wall of frusto-conical configuration, as shown at 18; when this cap member 17 is fitted on the valve body 1 it engages the corresponding outer surfaces of claws 12, as shown. At the bottom of this frusto-conical inner wall of cap member 17 there is formed an annular shoulder 19; besides, an axial bore 22 is formed through the top portion of the cap member 17; this bore is shouldered and dimensioned to receive a cooperating metal pin 23 of cylindrical and very slightly tapered configuration. A cord 24 or the like, formed with an end knot or ball portion 25, is threaded through an axial passage formed in this pin 23.

The valve is assembled by firstly fitting the collar 10 with its four integral extensions and claws 11, 12 on the piston 6 already fitted with its resilient, valve-forming disc 8 and its annular packing 7, then threading the compression spring 15 over these parts, and finally introducing the assembly 6, 7, 8, 10 and 11 into the chamber 5. Subsequently the pin 23 provided with the pulling cord 24 is inserted into the bore 22 of cap member 17 before screwing the latter on the body 1. Then this cap assembly is fitted on the body 1, the metal pin 23 moving between the four claws 12 and spreading them slightly apart. Finally, the cap member 17 is screwed home on the upper portion of the body 1; during this step the frusto-conical inner wall 18 of the cap member exerts a cam action on the four claws 12 and causes same to converge to the centre. These claws will thus clamp the central pin 23 and progressively be lowered with this pin and with the cap member 17 during the last portion of the screwing, thereby compressing the spring 15. As the claws 12 travel downward they carry along the piston 6 and the resilient disc 8 of this piston will engage the upper annular surface of the seat 4, thereby closing in a gas-tight manner the communication between passages 2 and 3.

Under these conditions, the claws 12 are tightly wedged between the frusto-conical lateral inner wall 18 of cap member 17 and the central pin 23, thereby locking the piston 6 in its valve-closing position.

It will be seen that when cap member 17 has been screwed in to an extent sufficient for wedging the central pin 23, there remains a certain gap between the shoulder 19 and cap member 17 and the upper edge 14 of body 1. Besides, the inner space formed in the cap member 17 is sufficiently hollow to position the upper face 20 of the cap member, which overlies the frusto-conical lateral wall 18, a certain distance away from the upper edges 21 of claws 12 when the cap member has been screwed in to the required extent.

The axial passage 2 of the valve communicates with the inner space of the compressed gas cylinder on which the valve is fastened, and its radial passage 3 communicates with the object to be inflated or the apparatus to be fed with compressed gas. The valve can be actuated very quickly by simply pulling the cord 24. The ball 25 drives the pin 23 out from the aperture 22 of cap member 17, this pin being in frictional engagement with claws 12. The latter, as the pin 23 is partly extracted from the aperture 22, are urged resiliently toward the axis of the valve and are allowed to move upward until they engage the upper inner face 20 of cap member 17; under the combined action of the spring 15 and of the gas pressure acting from beneath, the piston assembly is raised and the inclined side surfaces of claws 12 follow the frusto-conical inner wall 18 of the cap member, so that the sealing disc 8 secured to the piston 6 moves away from the top annular surface of seat 4, thereby allowing the fluid to flow from the inlet passage 2 through the lower portion of chamber 5 to the outlet passage 3 of the valve. The annular piston packing 7 prevents the compressed gas from escaping upwards and this gas is thus fed through the outlet 3 to the object to be inflated (not shown).

It is possible to re-close the valve without re-inserting the central pin 23. In fact, this closing may be effected by simply screwing home the cap member 17, as the inner bottom face 20 of this member will engage the upper faces 21 of claws 12 to lock the piston 6 in its valve-closing position. This possibility of closing the valve without re-inserting the central pin 23 is due to the fact that when this pin is mounted in the valve there remains a certain gap between the shoulder 19 and the upper edge 14 of body 1.

It is also possible to open the valve without removing the pin 23 by partly unscrewing the cap member 17, and this represents an additional and valuable safety feature in case the operator were not able to extract the pin 23 from the cap member, for instance in case the cord 24 were broken therein.

Figure 5:
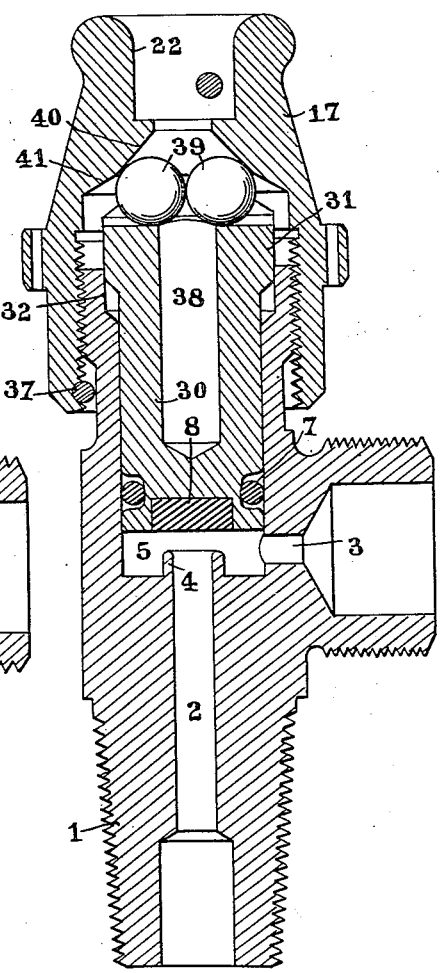

According to another form of embodiment of the valve forming the subject-matter of this invention, and as shown in Figs. 3 to 7 of the accompanying drawings, wherein members similar to those illustrated in Figs. 1 and 2 are designated with the same reference numerals, the valve comprises a body 1 also formed with an axial inlet passage 2 adapted to be connected to a source of compressed gas such as a gas cylinder, and with a radial outlet passage 3 adapted to be connected to the object to be unflated or fed with gas under pressure. The axial passage 2 opens into the lower portion of a chamber 5 extending throughout the upper inner portion of the body 1. At the upper end of this passage 2 there is formed a concentric seat 4 projecting into the lower portion of chamber 5. The latter has slidably mounted therein a piston 30 having an annular packing 7 providing a gas-tight seal between the piston and the inner cylindrical wall of chamber 5. Besides, as in the preceding embodiment, the piston carries in a recess formed in its lower face a disc 8 of resilient material, adapted to engage the upper annular surface of seat 4 for closing the inner end of passage 2.

In this embodiment the upper portion of piston 30 is formed with an axial bore constituting a blind aperture 38. The outer peripheral portion of the piston upper end constitutes a flange 31 slidably engaging another cylindrical wall 32 of chamber 5 which has a greater diameter than the lower portion of this chamber. The top face of piston 30 is formed with a diametral groove 34 adapted to receive a pair of balls 39.

A cap member 17 is screwed on the upper portion of the valve body 1 and a retaining pin 37 threaded through a hole 33 formed in the lower end of the cap member prevents the latter from being unscrewed by engaging the initial portion of the threads formed on the body 1. The cap member 17 is also formed with an inner recess (see Figs. 3 to 7) having a first frusto-conical portion 40 merging through its base with another frusto-conical portion 41 having a greater inclination with respect to the axis of cap member 17. An axial aperture 22 is formed through the top wall of cap member 17. A central pin 23 is inserted through this aperture 22 and extends through the blind hole 38 of piston 30. A cord 24 having a ball 25 attached to its inner end extends through the axial passage formed in the central pin 23. The pair of balls 39 are located in the recess formed in the cap member 17, one on either side of the central pin 23 (see Fig. 7), the lower surfaces of these balls engage the diametral groove 34 of piston 30 and their upper surfaces engaging the frusto-conical portion 41 of the lateral wall of the recess of cap member 17. For assembling the valve, the piston 30 is fitted into the chamber 5 of body 1. Then the cap member 17 is placed upon the upper portion of this body 1 after having inserted the two balls 39 into the groove 34 of the upper portion of piston 30. Subsequently, the cap member 17 is screwed on the upper portion of body 1 so as to engage only a few threads thereof, and the retaining pin 37 is fitted. Then the central pin 23 provided with the cord 24 and ball 25 is fitted through the aperture 22 of cap member 17 so as to push the balls 39 toward the periphery of the inner recess of cap member 17. Finally, the latter is screwed on the body 1 until the frusto-conical wall 41 acting as a cam face will wedge the balls 39 against the cap member 17, the pin 23 and the upper face of piston 30.

As the cap member 17 is being screwed on the valve body 1, the balls 39 move the piston 30 downward and cause the resilient disc 8 to bear tightly on the seat 4. It will be noted that the cap member 17 is not fully screwed on the body 1 (see Fig. 3).

The valve may be opened by partly unscrewing the cap member 17, without removing the pin 23. In fact, as the cap member is unscrewed, the balls 39 can move upward and free the piston 30 subjected to the gas pressure (see Fig. 4). The piston 30 carries along the disc 8 and thus the communication between the inlet passage 2 and the outlet passage 3 is established. However, it is possible to open the valve more quickly by simply pulling the cord 24, the latter driving the pin 23 out from the aperture 22. Thus the balls 39, urged by the piston 30, can move toward each other and upward in the central zone of the inner recess of cap member 17, to engage the frusto-conical wall 40, due to the gas pressure acting on the piston 30 (see Fig. 5). As the piston 30 moves upwards, it carries along the disc 8 and allows the fluid to flow from the inlet passage 2 to the outlet passage 3, for instance from the gas cylinder to the object to be inflated or fed with gas.

The valve may be re-closed without re-inserting the central pin 23, by simply screwing the cap member 17 fully on the body 1. The balls 39 are then in contact with each other but the frusto-conical wall 40 urges them against the upper face of piston 30, thereby locking this piston with its resilient disc 8 tightly engaging the upper annular surface of seat 4 (see Fig. 6). It will be appreciated that the frusto-conical wall 41 having the greater inclination with respect to the axis of the valve permits of exerting a relatively moderate pressure on the central pin 23, whilst the other frusto-conical wall 40 having a smaller inclination relative to this axis, enables the balls 39, after the pin 23 has been removed, to move upward to an extent sufficient to permit a substantial movement of the disc 8 with respect to the seat 4.

According to another possible embodiment of the valve of this invention, the balls are enclosed between a first profile consisting of two tapered portions milled or otherwise formed in the cap member 17 and corresponding for example to the walls 40 and 41 of Fig. 3, and another, similar profile of opposite direction formed in the upper portion of piston 6. This second profile 42, 43 is shown in chain-dotted lines in Fig. 3.

It will be readily understood that this invention is not limited to the inflating of bodies or articles to be used as floats or the like. It is also applicable to any devices wherein the expansion of a compressed fluid is to be obtained through a simple and very quick operation. Thus, for example, a valve according to this invention may be used for closing a fire-extinguisher containing either carbonic-acid "snow" or any other fire-extinguishing fluid or chemical in compressed form. Besides, this valve may be operatively connected to an automatic control device releasable by means of a detector, the latter consisting for example of a combustible or fusible cable or wire.

The valve according to the present invention is advantageous in that it can be actuated by an operator in any position, since a mere pull on the cord will suffice to actuate the valve and release the gas under pressure therethrough. Furthermore, this valve may also be operated as an ordinary cock, by unscrewing or screwing more or less the cap member according to the desired output. The valve can be reclosed even after removing the central pin, by fully screwing the cap member. The valve is also adapted for re-use after operation, and by introducing another or the same pin in the axial orifice of the cap member it is possible to restore the valve to its initial condition.

Finally, it would not be a departing from the invention to provide the valve with a safety duct intended to retain any excess pressure likely to be detrimental to the object to be inflated.

While the above description and the attached drawings relate to preferred forms of embodiment of the present invention, it will be readily understood by anybody conversant with the art that many modifications may be brought thereto without departing from the spirit and scope of the invention as set forth in the appended claims.

What I claim as new is:

1. A valve intended for controlling the flow of a fluid under pressure, comprising in combination a hollow body having a cavity open at one end, a pair of passages opening into said body at the other end of said cavity, one passage being the fluid inlet duct and the other passage the fluid outlet duct of the valve, a piston slidably mounted in said hollow body and adapted to obturate one of said passages, a cap member mounted on said hollow body at said one end of its cavity, said cap member comprising a central perforation, a central pin axially movable in said perforation and extending within said cap member and said hollow body, at least two locking members disposed on either side of said central pin between said cap member and said sliding piston, the inner wall of said cap member being inclined and engaging said locking members so as to wedge same against said central pin, said locking member being also adapted to maintain said sliding piston in the position in which it obturates one of said passages.

2. A valve according to claim 1, wherein said cap member is screwed on said body, and the zone of the inner wall of said cap member, which is situated in the vicinity of the centre of the bottom thereof, is adapted to engage said locking members for retaining said piston in its valve-closing position when said central pin is not fitted, by screwing said cap member fully on said valve body.

3. A valve according to claim 1, wherein said locking members consist of resilient claws secured to said fluid-tight piston.

4. A valve according to claim 1, wherein said locking members are balls wedged between said cap member and said pin, above the upper face of said fluid-tight piston.

5. A valve according to claim 1, wherein said cap member is screwed on said hollow body and said locking members consist of balls wedged between said cap member and said central pin, above the upper face of said fluid-tight piston, and wherein said inner wall of said cap member is bound by two frusto-conical zones of different inclination, merging with each other, the frusto-conical portion having the greater inclination with respect to the axis of said cap member being the farthest to the central perforation of said cap member and adapted to engage said balls so as to wedge same against said central pin, the lesser inclined frusto-conical zone being adapted to engage said balls for retaining said piston in its valve closing position only when said central pin is not inserted through said aperture in said cap member, after said cap member has been screwed home.

References Cited in the file of this patent
UNITED STATES PATENTS 785,395  Aass _____ Mar. 21, 1905